United States Patent
Liu et al.

(10) Patent No.: US 9,886,238 B2
(45) Date of Patent: Feb. 6, 2018

(54) METHOD, SYSTEM AND COMPUTER STORAGE MEDIUM FOR DETECTING AN AUDIO INPUT INTERFACE

(71) Applicant: Tencent Technology (Shenzhen) Company Limited, Shenzhen (CN)

(72) Inventors: Hong Liu, Shenzhen (CN); Yuanjiang Peng, Shenzhen (CN); Xingping Long, Shenzhen (CN); Chao Peng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 368 days.

(21) Appl. No.: 14/683,103

(22) Filed: Apr. 9, 2015

(65) Prior Publication Data

US 2015/0212792 A1 Jul. 30, 2015

Related U.S. Application Data

(63) Continuation of application No. PCT/CN2014/075663, filed on Apr. 18, 2014.

(30) Foreign Application Priority Data

May 27, 2013 (CN) .......................... 2013 1 0202043

(51) Int. Cl.
*G06F 17/00* (2006.01)
*G06F 3/16* (2006.01)
(Continued)

(52) U.S. Cl.
CPC ............. *G06F 3/167* (2013.01); *H04R 3/005* (2013.01); *G10L 2025/783* (2013.01);
(Continued)

(58) Field of Classification Search
CPC ...... H04M 3/569; H04M 3/561; H04M 3/568; G10L 2025/783
See application file for complete search history.

(56) References Cited

U.S. PATENT DOCUMENTS

| 2008/0040117 | A1  | 2/2008  | Yu |
|---|---|---|---|
| 2010/0085419 | A1* | 4/2010  | Goyal ................... H04N 7/147 348/14.09 |
| 2011/0267988 | A1* | 11/2011 | Simard ................. H04M 3/561 370/260 |

FOREIGN PATENT DOCUMENTS

| CN | 1805489 A  | 7/2006 |
|---|---|---|
| CN | 102056053 A | 5/2011 |

OTHER PUBLICATIONS

International Search Report and Written Opinion for PCT/CN2014/075663.

* cited by examiner

*Primary Examiner* — Thomas Maung
(74) *Attorney, Agent, or Firm* — Staas & Halsey LLP

(57) ABSTRACT

Provided is a method for detecting an audio input interface, comprising: acquiring input signals of every one of audio input interfaces; acquiring energy values of said input signals of every one of said audio input interfaces, and acquiring an interface identification of the audio input interface of which the energy value is the maximum among the energy values; adding said interface identification acquired herein into an identification sequence in an order by acquiring time; and identifying the audio input interface, of which the interface identification is saved most often in said identification sequence, as a valid audio input interface. Also provided is a system for detecting an audio input interface. The present disclosure is capable of effectively identifying the audio input interface connected to the microphone that (Continued)

the user is using, so that the user does not need to switch manually.

17 Claims, 6 Drawing Sheets

(51) Int. Cl.
    *H04R 3/00*     (2006.01)
    *G10L 25/78*     (2013.01)
    *H04M 3/56*     (2006.01)
    *H04R 27/00*     (2006.01)

(52) U.S. Cl.
    CPC ............ *H04M 3/561* (2013.01); *H04M 3/568* (2013.01); *H04M 3/569* (2013.01); *H04R 27/00* (2013.01)

METHOD, SYSTEM AND COMPUTER STORAGE MEDIUM FOR DETECTING AN AUDIO INPUT INTERFACE

CROSS-REFERENCE TO RELATED APPLICATIONS

This application is a continuation application of PCT patent application No. PCT/CN2014/075663, entitled "Method, System and Computer Storage Medium for Detecting an Audio Input Interface", filed on Apr. 18, 2014, which claims priority to Chinese Application No. 201310202043.3, entitled "Method and System for Detecting an Audio Input Interface", filed on May 27, 2013, both of which are incorporated by reference in their entirety.

TECHNICAL FIELD

The present disclosure relates to the field of audio processing, and more particularly to a method and a device for detecting an audio input interface.

BACKGROUND

Along with the popularity of voice software, it is becoming more accepted by most computer users, and has been an indispensable part in people's daily life gradually. The existing computer device often provides an option for choosing an audio input interface, which needs the user to manually switch to choose among different audio input interfaces, however, the switching method herein requires the user to manually try to choose each audio input interface one by one until a voice signal is heard, which is very inconvenient. Moreover, the user often makes misconnection due to not knowing the correct audio input interface, as a result, the correct voice input can not be acquired.

BRIEF SUMMARY

In view of the defects existing in conventional method and device mentioned above that, the microphone, to which a user is inputting voice signals, can not be identified automatically, but the user needs to manually switch to choose among audio input interfaces one by one, which is very inconvenient, an object of the present disclosure is to provide a method for detecting an audio input interface, by means of detecting the input data of every one of audio input interfaces, the audio input interface connected to the microphone, into which a voice signal is being input, can be effectively identified, which does not need the user to switch manually and is very convenient.

In one aspect, the present disclosure is realized by the following technical scheme:

A method for detecting an audio input interface comprises:

acquiring input signals of every one of audio input interfaces;

acquiring energy values of said input signals of every one of said audio input interfaces, and acquiring an interface identification of the audio input interface of which the energy value is the maximum among the energy values;

adding said interface identification acquired herein into an identification sequence in an order by acquiring time; and identifying the audio input interface, of which the interface identification is saved most often in said identification sequence, as a valid audio input interface.

In another aspect, the present disclosure is to provide a system for detecting an audio input interface, comprising:

an input detecting module, configured to acquire input signals of every one of audio input interfaces;

an energy detecting module, configured to acquire energy values of the input signals of every one of said audio input interfaces, and acquire an interface identification of the audio input interface of which the energy value is the maximum among the energy values;

an interface identification acquiring module, configured to add said interface identification acquired herein into an identification sequence in an order by acquiring time; and an identifying module, configured to identify the audio input interface, of which the interface identification is saved most often in said identification sequence, as a valid audio input interface.

According to the method and system for detecting an audio input interface of the present disclosure, input signals of every one of audio input interfaces are acquired at a preset time interval, energy values of said input signals of every one of said audio input interfaces are detected, and an interface identification of the audio input interface of which the energy value is the maximum among the energy values is acquired. Each of the interface identifications acquired is added to a preset identification sequence in an order by acquiring time. If the same interface identification is saved more often in said identification sequence, it means that, there are more such situations that the energy value of the input signal of the audio input interface corresponding to said interface identification is the maximum, and the audio input interface corresponding to said interface identification will be identified as a valid audio input interface. The present disclosure is capable of effectively identifying the audio input interface connected to the microphone that the user is using, and the user does not need to switch manually, which is very convenient, moreover, the influence of the noise on the result of identifying is reduced, thereby the result of identifying is more accurate.

DETAILED DESCRIPTION OF DISCLOSED EMBODIMENTS

In order to make the purpose, technical solutions and advantages of the present disclosure to be understood more clearly, the present disclosure will be described in further details with the accompanying drawings and the following embodiments. It should be understood that the specific embodiments described herein are merely examples to illustrate the disclosure, not to limit the present disclosure.

Figure 1:
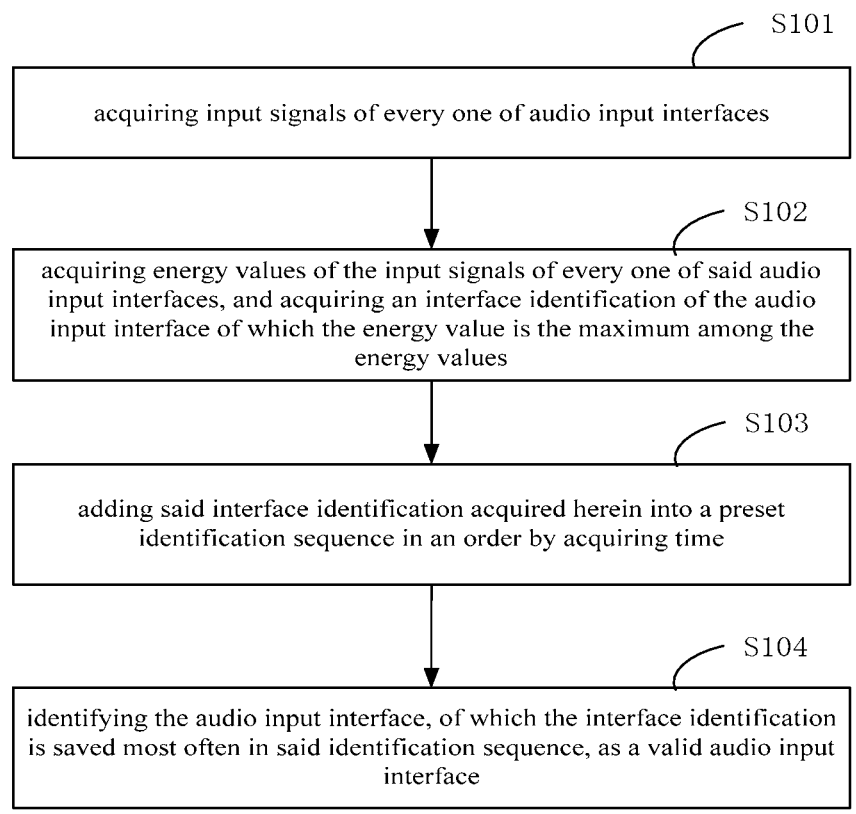
FIG. 1 is a schematic flow diagram illustrating the method for detecting an audio input interface according to the first embodiment of the present disclosure.

As shown in FIG. 1, which is a schematic flow diagram illustrating the method for detecting an audio input interface according to the first embodiment of the present disclosure, the method for detecting an audio input interface of said embodiment comprises following steps:

S101: acquiring input signals of every one of audio input interfaces;

S102: acquiring energy values of the input signals of every one of said audio input interfaces, and acquiring an interface identification of the audio input interface of which the energy value is the maximum among the energy values;

S103: adding said interface identification acquired herein into a preset identification sequence in an order by acquiring time;

S104: identifying the audio input interface, of which the interface identification is saved most often in said identification sequence, as a valid audio input interface.

According to the method for detecting an audio input interface of the present disclosure, input signals of every one of audio input interfaces are acquired at a preset time interval, energy values of said input signals of every one of said audio input interfaces are detected, and an interface identification of the audio input interface of which the energy value is the maximum among the energy values is acquired. Each of the interface identifications acquired is added to a preset identification sequence in an order by acquiring time. If the same interface identification is saved more often in said identification sequence, it means that, there are more such situations that the energy value of the input signal of the audio input interface corresponding to said interface identification is the maximum, and the audio input interface corresponding to said interface identification will be identified as a valid audio input interface. The method of the present disclosure is capable of effectively identifying the audio input interface connected to the microphone that the user is using, and the user does not need to switch manually, which is very convenient, moreover, the influence of the noise on the result of identifying is reduced, thereby the result of identifying is more accurate.

Wherein, with respect to step S101, the input signals of every one of audio input interfaces can be acquired through monitoring for and collecting data from each of said audio input interfaces. The input signals of every one of said audio input interfaces comprise input signals from a microphone hardware-connected to any one of said audio input interfaces, noise signals, and so on. In one embodiment, all of the audio input interfaces can be enumerated by means of calling a function of Dsound API (Direct Sound Capture Enumerate( ).

After all of the audio input interfaces of the device having been detected, the input data of every one of the audio input interfaces is acquired by means of collecting the input signals of every one of said audio input interfaces. Preferably, the parameter of each of the audio input interfaces is preset to unify the audio collecting format for each of the audio input interfaces, such as using an audio collecting format with mono-channel, and 44.1 KHz of sampling rate. By unifying the audio collecting format of each of the audio input interfaces, a large amount of computational load can be reduced in the post processing of the input signals, and the speed of identifying the microphone can be increased.

In one embodiment, input signals of every one of audio input interfaces are acquired simultaneously at a preset time interval, which comprises following sub-steps:

S1011: simultaneously collecting input signals of every one of said audio input interfaces, and encapsulating said input signals of every one of said audio input interfaces collected at the same time into a frame of detection data.

S1012: de-interleaving each of frames of said detection data so as to acquire the input signals of every one of said audio input interfaces. Moreover, each of frames of said detection data can be saved; one of said frames of detection data is extracted every preset frames and further de-interleaved so as to acquire the input signals of every one of said audio input interfaces contained in said frame of detection data.

In one embodiment, when encapsulating the input signals of every one of said audio input interfaces, each of the input signals is collected in an unit of 20 milliseconds, and then signals of every one of the input signals are put in a buffer with a M*20 (M represents the number of the devices enumerated) milliseconds length, the corresponding data is acquired from said buffer and encapsulated.

In this way, the input signals (such as N channels of input signals, N is a nature number) of every one of audio input interfaces are encapsulated in respective frames of detection data. By simply extracting one frame of said detection data every certain frames, the purpose of sampling said input signals at a preset time interval can be realized. By simply de-interleaving the detection data extracted, the input signals of every one of audio input interfaces can be re-acquired, which is very convenient.

Furthermore, after the input signals of every one of said audio input interfaces have been acquired, each of the input signals is pre-processed so as to ensure the accuracy of the result of the detection. The pre-processing comprises high-pass filtering, filtering certain frequency interferences, noise suppression, and so on, so as to reduce the influence of the noise on the detection of the input signals.

With respect to S102, the energy values of the input signals of every one of said audio input interfaces acquired herein are detected and acquired, each energy value represents the intensity of a respective input signal. The energy value of an input signal is the maximum among the energy values, means that the intensity of the input signal is the strongest, and the audio input interface corresponding to said input signal is most likely connected to a microphone being used by the user. The interface identification of said audio input interface is acquired to identify the audio input interface of the input signal whose intensity is the strongest in the present detection.

With respect to S103, said interface identification acquired herein is added into an identification sequence in an order by acquiring time. Said identification sequence may be created in a buffer or in other types of memories, so that it is easy to be accessed.

Preferably, said identification sequence follows the rule of first-in-and-first-out in an order by acquiring time, and the quantity of the interface identifications saved each time is less than or equal to a preset quantity. That is, if the quantity of interface identifications saved in said identification sequence reaches said preset quantity, whenever a new interface identification is added, an interface identification of which the acquiring time (in another word, the save time) is the earliest will be discarded. The quantity of the interface identifications saved in said identification sequence is maintained in said preset quantity, such as 25, and the most recently acquired 25 of interface identifications will always be saved. The interface identifications saved in the identification sequence may be the same, that is, said identification sequence may contain multiple of the same interface identification.

S104: identifying the audio input interface, of which the interface identification is saved most often in said identification sequence, as a valid audio input interface.

The more often the same interface identifications is saved in said identification sequence, means that the more often the audio frequency with the maximum value is input into the audio input interface corresponding to said interface identification, and the audio input interface corresponding to said input signal is most likely connected to a microphone being used by the user, and the correct chance will be high to identify said audio input interface corresponding to said interface identification as a valid audio input interface. And with the increasing of the quantity of the interface identifications saved in said identification sequence, the accuracy of identifying will be further increased. Moreover, after the valid audio input interface has been identified, said audio input interface may be automatically matched to an audio software in the background for processing. Alternatively, the input signal of said audio input interface may be subject to processing such as filtering and so on, before it is output into said audio software in the background for processing. After said audio input interface has been identified, a user interface may be further displayed, on which the audio input interface identified currently or the microphone or other audio input devices connected to said audio input interface will be shown. The start and the end of the method for detecting an audio input interface of the present disclosure may be triggered through many different modes, for example, it may be set to start the detection when it is detected that the microphone is inserted, or it may be set to start the detection when a start instruction is received; also for example, it may be set to end the detection when the right input interface is detected, or it may be set to end the detection when the microphone is removed, or it may be set to end the detection when an end instruction is received, and so on.

Figure 2:
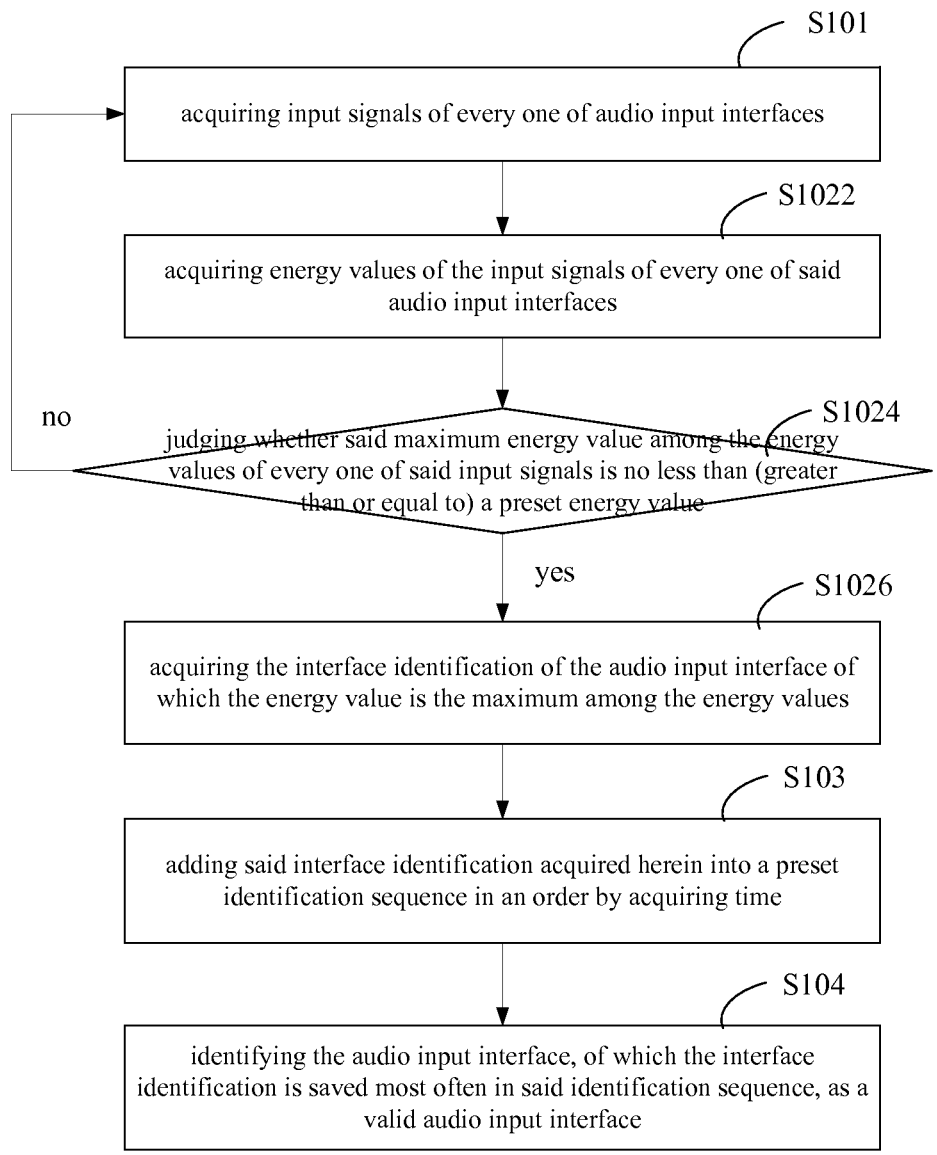
FIG. 2 is a schematic flow diagram illustrating the method for detecting an audio input interface according to the second embodiment of the present disclosure.

As shown in FIG. 2, which is a schematic flow diagram illustrating the method for detecting an audio input interface according to the second embodiment of the present disclosure, the step S102 is specified as following sub-steps:

S1022: acquiring energy values of the input signals of every one of said audio input interfaces;

S1024: judging whether said maximum energy value among the energy values of every one of said input signals is no less than (greater than or equal to) a preset energy value;

if it is, then going to S1026; if it is not, then judging the input signals of every one of the audio input interfaces as all invalid, and re-acquiring input signals of every one of said input interfaces;

S1026: acquiring the interface identification of the audio input interface of which the energy value is the maximum among the energy values.

The method for detecting an audio input interface in this embodiment is mainly different from the first embodiment as shown in FIG. 1 in that, prior to said acquiring an interface identification of the audio input interface of which the energy value is the maximum among the energy values (S1026), the method further comprises step S1024.

According to the method for detecting an audio input interface in this embodiment, the interface identification of the audio input interface of which the energy value is the maximum among the energy values is acquired only when it is judged that said maximum energy value among the energy values of every one of said input signals is greater than or equal to a preset energy value, otherwise, the input signals of every one of said audio input interfaces are judged as all invalid. As a result, if the audio input with the maximum energy value is created by a noise, said audio input will be judged as an invalid signal as long as the intensity of noise is less than said preset energy value, and the result of the identification will not be affected, the influence of the noise on the result of the identification is effectively reduced.

Figure 3:
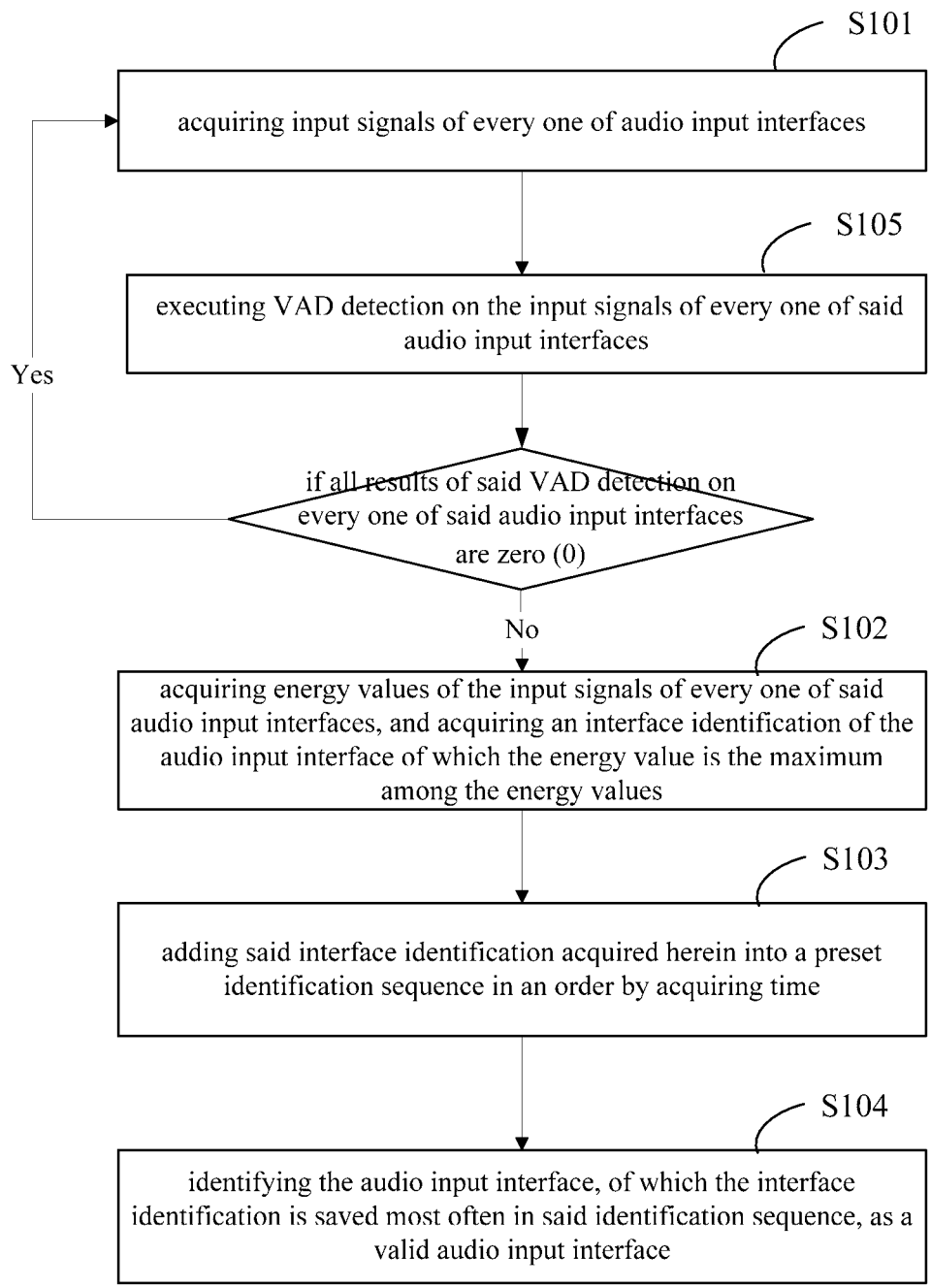
FIG. 3 is a schematic flow diagram illustrating the method for detecting an audio input interface according to the third embodiment of the present disclosure.

As shown in FIG. 3, which is a schematic flow diagram illustrating the method for detecting an audio input interface according to the third embodiment of the present disclosure, the method for detecting an audio input interface in this embodiment is mainly different from the first embodiment as shown in FIG. 1 in that, after said acquiring input signals of every one of audio input interfaces, the method further comprises the following step S105:

S105: executing VAD detection on the input signals of every one of said audio input interfaces;

if all results of said VAD detection on every one of said audio input interfaces are zero (0), then judging said input signals of every one of said audio input interfaces as all invalid, and re-acquiring input signals of every one of said input interfaces;

if at least one of the results of said VAD detection of every one of said audio input interfaces is one (1), then judging the input signals of every one of audio input interfaces as valid, and going to step S102 to acquire energy values of the input signals of every one of said audio input interfaces, and acquire an interface identification of the audio input interface of which the energy value is the maximum among the energy values.

Said VAD detection is so called voice activity detection, which can effectively detect the activity of the input signals, identify the input signal which may be the audio input, and increase the speed of identifying the activities audio input interface. If all results of the VAD detection are 0, that means every one of said audio input interfaces are currently in a muted state; if at least one of results of said audio input interfaces is 1, then at least one of said audio input interfaces has an audio input, and the input signals of every one of audio input interfaces collected herein can be judged as valid, and then the next step (acquiring energy values of the input signals of every one of said audio input interfaces, and acquiring an interface identification of the audio input interface of which the energy value is the maximum among the energy values) is executed.

Figure 4:
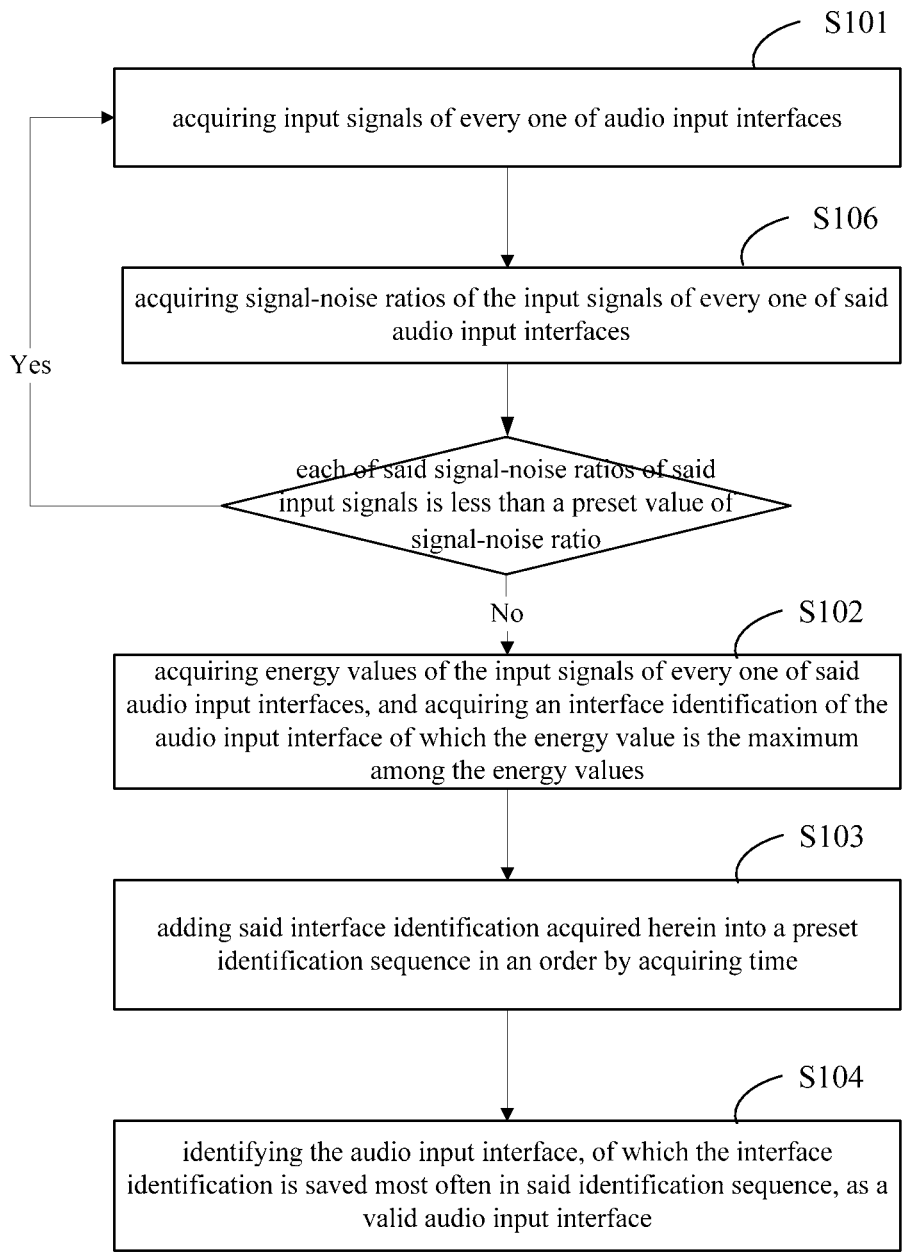
FIG. 4 is a schematic flow diagram illustrating the method for detecting an audio input interface according to the fourth embodiment of the present disclosure.

As shown in FIG. 4, which is a schematic flow diagram illustrating the method for detecting an audio input interface according to the fourth embodiment of the present disclosure, the method for detecting an audio input interface in this embodiment is mainly different from the first embodiment as shown in FIG. 1 in that, after said acquiring input signals of every one of audio input interfaces, the method further comprises the following step S106:

acquiring signal-noise ratios of the input signals of every one of said audio input interfaces;

if each of said signal-noise ratios of said input signals is less than a preset value of signal-noise ratio, then judging the input signals of every one of said audio input interfaces as invalid, and re-acquiring input signals of every one of said audio input interfaces;

if at least one of said signal-noise ratios of each of said input signals is no less than said preset value of signal-noise ratio, then judging every one of said input signals as valid, and going to step S102 to acquire energy values of the input signals of every one of said audio input interfaces, and acquire an interface identification of the audio input interface of which the energy value is the maximum among the energy values.

The so called signal-noise ratio is a ratio of a normal sound signal to a noise signal (power) with no-sound signal, and it is often represented in the unit of dB. In this embodiment, the signal-noise ratios of every one of audio input signals are detected, and the input signals of the audio input interface are judged as valid only when at least one of the signal-noise ratios of said audio input interfaces is no less than the preset value of signal-noise ratio, otherwise, the input signals of the audio input interface are judged as invalid. As a result, the influence of the noise on identifying an active audio input interface is reduced, and the accuracy of identifying is improved.

In a preferred embodiment, any two or any three of steps S1021, S105 and S106 can be selected and executed in combination simultaneously, thereby further improving the accuracy and efficiency of identifying.

In another preferred embodiment of the method, after said identifying the audio input interface, of which the interface identification is saved most often in said identification sequence, as a valid audio input interface, further executing a step of post-processing to the audio input interface identified by adjusting parameters related to the device so as to make the microphone connected to said device in the best working state.

Said post-processing comprises: executing a self-adaptive microphone volume adjustment to said valid audio input interface, that is, software/hardware AGC (Automatic Gain Control) processing, self-adaptively adjusting the volume of the microphone, so as to make the microphone in the best volume state; executing a signal-noise ratio detection, starting a noise suppression according to the result of the detection, and so on.

According to the method of the present disclosure, the user does not need to participate in setting the device, but the device will automatically select the microphone, to which the user is inputting voice signals, and the problem of no sound will never happen, and the corresponding result of the configuration will be displayed in a user interface. When there are multiple microphones with different acoustic characteristics connected to one device, the user simply needs to speak to the microphone he wants, then the automatically switching of the audio input interfaces will be achieved, without the need of manual setting. If the microphone is broken and no sound is collected, the device can also automatically switch off the corresponding audio input interface, without the need of manual setting. With the method of the present disclosure, the user who doesn't know how to set the microphone is relieved from the difficulty, which is a convenience for the user.

Figure 5:
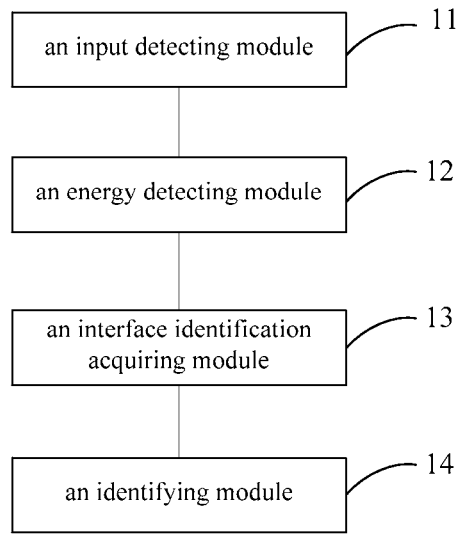
FIG. 5 is a structure diagram illustrating the system for detecting an audio input interface according to the first embodiment of the present disclosure.

As shown in FIG. 5, which is a structure diagram illustrating the system for detecting an audio input interface according to the first embodiment of the present disclosure, said system for detecting an audio input interface of present disclosure comprises:

an input detecting module 11, configured to acquire input signals of every one of audio input interfaces;

an energy detecting module 12, configured to acquire signals of every one of said audio input interfaces, and acquire an interface identification of the audio input interface of which the energy value is the maximum among the energy values;

an interface identification acquiring module 13, configured to add said interface identification acquired herein into an identification sequence in an order by acquiring time;

an identifying module 14, configured to the audio input interface, of which the interface identification is saved most often in said identification sequence, as a valid audio input interface.

According to the system for detecting an audio input interface of the present disclosure, input signals of every one of audio input interfaces are acquired at a preset time interval, energy values of said input signals of every one of said audio input interfaces are detected, and an interface identification of the audio input interface of which the energy value is the maximum among the energy values is acquired. Each of the interface identifications acquired is added to a preset identification sequence in an order by acquiring time. If the same interface identification is saved more often in said identification sequence, it means that, there are more such situations that the energy value of the input signal of the audio input interface corresponding to said interface identification is the maximum, and the audio input interface corresponding to said interface identification will be identified as a valid audio input interface. The system of the present disclosure is capable of effectively identifying the audio input interface connected to the microphone that the user is using, and the user does not need to switch manually, which is very convenient, moreover, the influence of the noise on the result of identifying is reduced, thereby the result of identifying is more accurate.

Wherein, with respect to said input detecting module 11, the input signals of every one of audio input interfaces can be acquired through monitoring for and collecting data from each of said audio input interfaces. The input signals of every one of said audio input interfaces comprises input signals from a microphone hardware-connected to any one of said audio input interfaces, noise signals, and so on. In one embodiment, all of the audio input interfaces can be enumerated by means of calling a function of Dsound API (Direct Sound Capture Enumerate( )).

After all of the audio input interfaces of the device having been detected, the input data of every one of the audio input interfaces is acquired by means of collecting the input signals of every one of said audio input interfaces. Preferably, the parameter of each of the audio input interfaces is preset to unify the audio collecting format for each of the audio input interfaces, such as using an audio collecting format with mono-channel, and 44.1 KHz of sampling rate. By unifying the audio collecting format of each of the audio input interfaces, a large amount of computational load can be reduced in the post processing of the input signals, and the speed of identifying the microphone can be increased.

In one embodiment, said input detecting module 11 comprises following sub-modules:

a collecting unit, configured to simultaneously collecting input signals of every one of said audio input interfaces;

an encapsulating unit, configured to encapsulate said input signals of every one of said audio input interfaces being collected at the same time into a frame of detection data;

an extracting unit, configured to de-interleave each of frames of said detection data so as to acquire the input signals of every one of said audio input interfaces contained in said frame of detection data.

Moreover, said input detecting module 11 further comprises a saving unit, configured to save each of frames of said detection data; said extracting unit is further configured to extract one of said frames of detection data every preset frames, and then de-interleave said frame extracted.

For example, when the encapsulating unit encapsulates the input signals of every one of said audio input interfaces, each of the input signals is collected in an unit of 20 milliseconds, and then signals of every one of the input signals are put in a buffer with a M*20 (M represents the number of the devices enumerated) milliseconds length, the corresponding data is acquired from said buffer and encapsulated.

In this way, the input signals (such as N channels of input signals, N is a nature number) of every one of audio input interfaces are encapsulated in respective frames of detection data. By simply extracting one frame of said detection data every certain frames, the purpose of sampling said input signals at a preset time interval can be realized. By simply de-interleaving the detection data extracted, the input signals of every one of audio input interfaces can be re-acquired, which is very convenient.

Furthermore, after the input detecting module 11 has acquired the input signals of every one of said audio input interfaces, each of the input signals is pre-processed so as to ensure the accuracy of the result of the detection. The pre-processing comprises high-pass filtering, filtering certain frequency interferences, noise suppression, and so on, so as to reduce the influence of the noise on the detection of the input signals.

With respect to said energy detecting module 12, the energy values of the input signals of every one of said audio input interfaces acquired herein are detected and acquired, each energy value represents the intensity of a respective input signal. The energy value of an input signal is the maximum among the energy values, means that the intensity of the input signal is the strongest, and the audio input interface corresponding to said input signal is most likely connected to a microphone being used by the user. The interface identification of said audio input interface is acquired to identify the audio input interface of the input signal whose intensity is the strongest in the present detection.

With respect to said interface identification acquiring module 13, said interface identification acquired herein is added into an identification sequence in an order by acquiring time. Said identification sequence may be created in a buffer or in other types of memories, so that it is easy to be accessed.

Preferably, said identification sequence follows the rule of first-in-and-first-out in an order by acquiring time, and the quantity of the interface identifications saved each time is less than or equal to a preset quantity. That is, if the quantity of interface identifications saved in said identification sequence reaches said preset quantity, whenever a new interface identification is added, an interface identification of which the acquiring time (in another word, the save time) is the earliest will be discarded. The quantity of the interface identifications saved in said identification sequence is maintained in said preset quantity, such as 25, and the most recently acquired 25 of interface identifications will always be saved. The interface identifications saved in the identification sequence may be the same, that is, said identification sequence may contain multiple of the same interface identification.

With respect to said identifying module 14, it is configured to identify the audio input interface, of which the interface identification is saved most often in said identification sequence, as a valid audio input interface.

The more often the same interface identifications is saved in said identification sequence, means that the more often the audio frequency with the maximum value is input into the audio input interface corresponding to said interface identification, and the audio input interface corresponding to said input signal is most likely connected to a microphone being used by the user, and the correct chance will be high to identify said audio input interface corresponding to said interface identification as a valid audio input interface. And with the increasing of the quantity of the interface identifications saved in said identification sequence, the accuracy of identifying will be further increased.

Moreover, after the valid audio input interface has been identified, said audio input interface may be automatically matched to an audio software in the background for processing. Alternatively, the input signal of said audio input interface may be subject to processing such as filtering and so on, before it is output into said audio software in the background for processing. After said audio input interface has been identified, a user interface may be further displayed, on which the audio input interface identified currently or the microphone or other audio input devices connected to said audio input interface will be shown.

The start and the end of the system for detecting an audio input interface of the present disclosure may be triggered through many different modes, for example, it may be set to start the detection when it is detected that the microphone is inserted, or it may be set to start the detection when a start instruction is received; also for example, it may be set to end the detection when the right input interface is detected, or it may be set to end the detection when the microphone is removed, or it may be set to end the detection when an end instruction is received, and so on.

The present disclosure further provides a second embodiment of the system for detecting an audio input interface, which is mainly different from the first embodiment as shown in FIG. 5 in that, prior to acquiring an interface identification of said audio input interface of which the energy value is the maximum among the energy values, said interface identification acquiring module 13 further judges whether said maximum energy value among the energy values of every one of said input signals is no less than (greater than or equal to) a preset energy value; if it is, then acquires the interface identification of the audio input interface of which the energy value is the maximum among the energy values; if it is not, then judges the input signals of every one of the audio input interfaces as all invalid, and re-acquires input signals of every one of said input interfaces;

According to the system for detecting an audio input interface in this embodiment, said interface identification acquiring module 13 acquires the interface identification of the audio input interface of which the energy value is the maximum among the energy values only when it is judged that said maximum energy value among the energy values of every one of said input signals is greater than or equal to a preset energy value, otherwise, the input signals of every one of said audio input interfaces are judged as all invalid. As a result, if the audio input with the maximum energy value is created by a noise, said audio input will be judged as an invalid signal as long as the intensity of noise is less than said preset energy value, and the result of the identification will not be affected, the influence of the noise on the result of the identification is effectively reduced.

Figure 6:
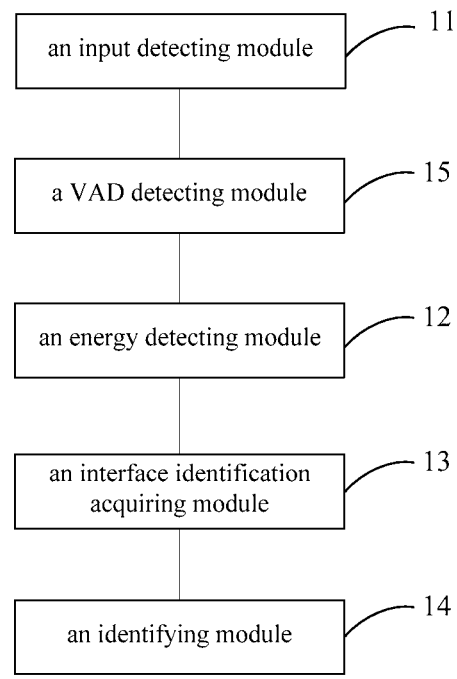
FIG. 6 is a structure diagram illustrating the system for detecting an audio input interface according to the third embodiment of the present disclosure.

As shown in FIG. 6, which is a structure diagram illustrating the system for detecting an audio input interface according to the third embodiment of the present disclosure, the system for detecting an audio input interface in this embodiment is mainly different from the first embodiment as shown in FIG. 5 in that, the system further comprises a VAD detecting module 15;

Said VAD detecting module 15 is configured to execute VAD detection on the input signals of every one of said audio input interfaces;

if all results of said VAD detection on every one of said audio input interfaces are zero (0), then judging said input signals of every one of said audio input interfaces as all invalid, and re-acquiring input signals of every one of said input interfaces; if at least one of the results of said VAD detection of every one of said audio input interfaces is one (1), then judging the input signals of every one of audio input interfaces as valid, and said energy detecting module 12 acquires energy values of the input signals of every one of said audio input interfaces, and acquire an interface identification of the audio input interface of which the energy value is the maximum among the energy values.

Said VAD detection is so called voice activity detection, which can effectively detect the activity of the input signals, identify the input signal which may be the audio input, and increase the speed of identifying the activities audio input interface. If all results of the VAD detection are 0, that means every one of said audio input interfaces are currently in a muted state; if at least one of results of said audio input interfaces is 1, then at least one of said audio input interfaces has an audio input, and the input signals of every one of audio input interfaces collected herein can be judged as valid, and then the next step (acquiring energy values of the input signals of every one of said audio input interfaces, and acquiring an interface identification of the audio input interface of which the energy value is the maximum among the energy values) is executed.

Figure 7:
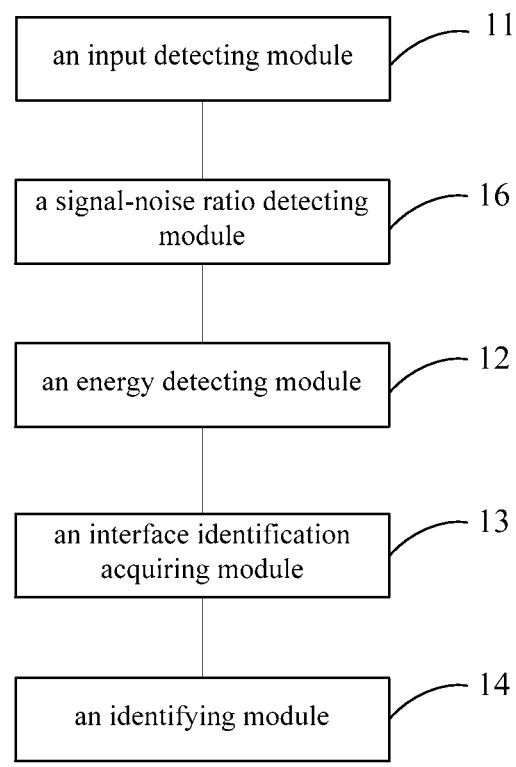
FIG. 7 is a structure diagram illustrating the system for detecting an audio input interface according to the fourth embodiment of the present disclosure.

As shown in FIG. 7, which is a structure diagram illustrating the system for detecting an audio input interface according to the fourth embodiment of the present disclosure, the system is mainly different from the first embodiment as shown in FIG. 5 in that, the system further comprises a signal-noise ratio detecting module 16, which is configured to acquire signal-noise ratios of the input signals of every one of said audio input interfaces; if each of said signal-noise ratios of said input signals is less than a preset value of signal-noise ratio, then judging the input signals of every one of said audio input interfaces as invalid, and re-acquiring input signals of every one of said audio input interfaces; if at least one of said signal-noise ratios of each of said input signals is no less than said preset value of signal-noise ratio, then judging every one of said input signals as valid, said energy detecting module 12 acquires energy values of the input signals of every one of said audio input interfaces, and acquire an interface identification of the audio input interface of which the energy value is the maximum among the energy values.

The so called signal-noise ratio is a ratio of a normal sound signal to a noise signal (power) with no-sound signal, and it is often represented in the unit of dB. In this embodiment, the signal-noise ratios of every one of audio input signals are detected, and the input signals of the audio input interface are judged as valid only when at least one of the signal-noise ratios of said audio input interfaces is no less than the preset value of signal-noise ratio, otherwise, the input signals of the audio input interface are judged as invalid. As a result, the influence of the noise on identifying an active audio input interface is reduced, and the accuracy of identifying is improved.

In a preferred embodiment, any two or any three of said interface identification acquiring module 13, said VAD detecting module 15 and said signal-noise ratio detecting module 16 can be selected and adopted in combination, thereby further improving the accuracy and efficiency of identifying.

In another preferred embodiment of the system, after said identifying module 14 identifies the audio input interface, of which the interface identification is saved most often in said identification sequence, as a valid audio input interface, post-processing is further executed to the audio input interface identified by adjusting parameters related to the device so as to make the microphone connected to said device in the best working state.

Said post-processing comprises: executing a self-adaptive microphone volume adjustment to said valid audio input interface, that is, software/hardware AGC (Automatic Gain Control) processing, self-adaptively adjusting the volume of the microphone, so as to make the microphone in the best volume state; executing a signal-noise ratio detection, starting a noise suppression according to the result of the detection, and so on.

According to the system of the present disclosure, the user does not need to participate in setting the device, but the device will automatically select the microphone, to which the user is inputting voice signals, and the problem of no sound will never happen, and the corresponding result of the configuration will be displayed in a user interface. When there are multiple microphones with different acoustic characteristics connected to one device, the user simply needs to speak to the microphone he wants, then the automatically switching of the audio input interfaces will be achieved, without the need of manual setting. If the microphone is broken and no sound is collected, the device can also automatically switch off the corresponding audio input interface, without the need of the user's manual setting. With the system of the present disclosure, the user who doesn't know how to set the microphone is relieved from the difficulty, which is a convenience for the user.

The person skilled in the art can understand that, all of or part of the processes and the corresponding system implementing the embodiments mentioned above, may be achieved by means of relevant hardware commanded by computer programs, the computer programs may be saved in the computer readable storage medium, and they may comprise the processes of embodiments of the respective methods and systems mentioned above when the programs are executed. Wherein, the storage medium may be a disk or CD or read-only memory or random access memory, and so on.

The foregoing examples are preferred embodiments of the present disclosure only and not intended to limit the present disclosure. It should be understood that, to the person skilled in the art, various modifications and improvements can be made without departing from the spirit and principle of the present disclosure, which should all be included within the scope of the present disclosure. Therefore, the protection scope of the present disclosure shall be defined by the appended claims.

What is claimed is:

1. A method for detecting an audio input interface by performing an iterative process, the iterative process comprising the steps of:
   (a) acquiring input signals of a plurality of audio input interfaces;
   (b) acquiring energy values of said input signals of the plurality of audio input interfaces; and (c) judging whether a maximum energy value among the energy values of said input signals is no less than a preset energy value, wherein when said judging judges that said maximum energy value among the energy values of said input signals is no less than the preset energy value, acquiring an interface identification of the audio input interface of which the energy value is the maximum among the energy values, adding said interface identification acquired herein into an identification sequence in an order by acquiring time, and identifying the audio input interface, of which the interface identification is saved most often in said identification sequence, as a valid audio input interface; and when said judging judges that said maximum energy value among the energy values of said input signals is less than the preset energy value, judging said input signals of the plurality of audio input interfaces as all invalid, and returning to the step of (a).

2. The method for detecting an audio input interface according to claim 1, wherein the iterative process further comprises the steps of:

when a quantity of interface identifications saved in said identification sequence reaches a preset quantity, whenever a new interface identification is added, one saved interface identification of which the acquiring time is the earliest will be discarded.

3. The method for detecting an audio input interface according to claim 1, wherein, after said acquiring input signals of the plurality of audio input interfaces, the iterative process further comprises the steps of:

executing Voice Activity Detection on said input signals of the plurality of audio input interfaces;

when all results of said Voice Activity Detection on the plurality of audio input interfaces are zero, judging said input signals of the plurality of audio input interfaces as all invalid, and re-acquiring input signals of the plurality of input interfaces; and when at least one of the results of said Voice Activity Detection of the plurality of audio input interfaces is one, judging said input signals of the plurality of audio input interfaces as valid, acquiring energy values of said input signals of the plurality of said audio input interfaces, and acquiring an interface identification of the audio input interface of which the energy value is the maximum among the energy values.

4. The method for detecting an audio input interface according to claim 1, wherein, after said acquiring input signals of the plurality of audio input interfaces, the iterative process further comprises the steps of:

acquiring signal-noise ratios of said input signals of the plurality of audio input interfaces;

when each of said signal-noise ratios of said input signals is less than a preset value of signal-noise ratio, judging said input signals of the plurality of audio input interfaces as invalid, and re-acquiring input signals of the plurality of audio input interfaces; and when at least one of said signal-noise ratios of each of said input signals is no less than said preset value of signal-noise ratio, judging every one of said input signals as valid, acquiring energy values of said input signals of the plurality of audio input interfaces, and acquiring an interface identification of the audio input interface of which the energy value is the maximum among the energy values.

5. The method for detecting an audio input interface according to claim 1, wherein, said acquiring input signals of the plurality of audio input interfaces comprises following sub-steps:

simultaneously collecting input signals of the plurality of audio input interfaces, and encapsulating said input signals of the plurality of audio input interfaces collected at the same time into a frame of detection data;

de-interleaving each of frames of said detection data so as to acquire said input signals of the plurality of audio input interfaces.

6. The method for detecting an audio input interface according to claim 5, wherein, said de-interleaving each of frames of said detection data comprises the following sub-steps:

saving each of frames of said detection data;

extracting one of said frames of detection data every preset frames, and then de-interleaving said frame extracted herein.

7. A system for detecting an audio input interface, comprising:

an input detecting module, configured to perform step (a) of acquiring input signals of a plurality of audio input interfaces;

an energy detecting module, configured to perform step (b) of acquiring energy values of said input signals of the plurality of audio input interfaces;

an interface identification acquiring module and an identifying module configured to perform step (c) of judging whether said maximum energy value among the energy values of said input signals is no less than a preset energy value, wherein when said judging of the interface identification acquiring module judges that said maximum energy value among the energy values of said input signals is no less than a preset energy value, the energy detecting module acquires an interface identification of the audio input interface of which the energy value is the maximum among the energy values, the interface identification acquiring module adds said interface identification acquired herein into an identification sequence in an order by acquiring time, and the identifying module identifies the audio input interface, of which the interface identification is saved most often in said identification sequence, as a valid audio input interface; and when said judging of the interface identification acquiring module judges said maximum energy value among the energy values of said input signals is less than the preset energy value, judging said input signals of the plurality of audio input interfaces as all invalid, and returning to the input detecting module to perform step (a) so as to perform an iterative process of steps (a), (b), and (c).

8. The system for detecting an audio input interface according to claim 7, wherein, the interface identification acquiring module is configured to discard one saved interface identification of which the acquiring time is the earliest whenever a new interface identification is added, if a quantity of interface identifications saved in said identification sequence reaches a preset quantity.

9. The system for detecting an audio input interface according to claim 7, further comprising:
a Voice Activity Detecting module, configured to execute Voice Activity Detection on said input signals of the plurality of audio input interfaces;
when all results of said Voice Activity Detection on the plurality of audio input interfaces are zero, the system
judges said input signals of the plurality of audio input interfaces as all invalid, and
re-acquires input signals of the plurality of input interfaces; and
when at least one of the results of said Voice Activity Detection on the plurality of audio input interfaces is one,
the system judges said input signals of the plurality of audio input interfaces as valid,
the energy detecting module acquires energy values of said input signals of the plurality of audio input interfaces, and
acquires an interface identification of the audio input interface of which the energy value is the maximum among the energy values.

10. The system for detecting an audio input interface according to claim 7, furthering comprising:
a signal-noise ratio detecting module, configured to acquire signal-noise ratios of said input signals of the plurality of audio input interfaces;
when each of said signal-noise ratios of said input signals is less than a preset value of signal-noise ratio, the system
judges said input signals of the plurality of audio input interfaces as invalid, and
re-acquires input signals of the plurality of audio input interfaces; and
when at least one of said signal-noise ratios of each of said input signals is no less than said preset value of signal-noise ratio, the system judges
every one of said input signals as valid,
the energy detecting module acquires energy values of said input signals of the plurality of audio input interfaces, and
acquires an interface identification of the audio input interface of which the energy value is the maximum among the energy values.

11. The system for detecting an audio input interface according to claim 7, wherein, said input detecting module comprises following sub-modules:
a collecting unit, configured to simultaneously collecting input signals of the plurality of audio input interfaces;
an encapsulating unit, configured to encapsulate said input signals of the plurality of audio input interfaces being collected at the same time into a frame of detection data;
an extracting unit, configured to de-interleave each of frames of said detection data so as to acquire said input signals of the plurality of audio input interfaces contained in said frame of detection data.

12. The system for detecting an audio input interface according to claim 11,
wherein, said input detecting module further comprises a saving unit, which is configured to save each of frames of said detection data; and
wherein said extracting unit is further configured to extract one of said frames of detection data every preset frames, and then de-interleave said frame extracted.

13. One or more non-transitory computer readable storage medium, including computer executable instructions, said executable instructions are configured to execute a method for detecting an audio input interface by performing an iterative process, wherein the iterative process comprising the steps of:
(a) acquiring input signals a plurality of audio input interfaces;
(b) acquiring energy values of said input signals of the plurality of audio input interfaces; and
(c) judging whether a maximum energy value among the energy values of said input signals is no less than a preset energy value,
wherein when said judging judges that said maximum energy value among the energy values of said input signals is no less than the preset energy value,
acquiring the interface identification of the audio input interface of which the energy value is the maximum among the energy values,
adding said interface identification acquired herein into an identification sequence in an order by acquiring time, and
identifying the audio input interface, of which the interface identification is saved most often in said identification sequence, as a valid audio input interface; and
when said judging judges that said maximum energy value among the energy values of said input signals is less than the preset energy value,
judging said input signals of the plurality of audio input interfaces as all invalid, and
returning to the step of (a).

14. The one or more non-transitory computer readable storage medium according to claim 13, wherein the iterative process further comprises the steps of:
when a quantity of interface identifications saved in said identification sequence reaches a preset quantity, whenever a new interface identification is added, one saved interface identification of which the acquiring time is the earliest will be discarded.

15. The one or more non-transitory computer readable storage medium according to claim 14, wherein, after said acquiring input signals of the plurality of audio input interfaces, the iterative process further comprises the steps of:
executing Voice Activity Detection on said input signals of the plurality of audio input interfaces;
when all results of said Voice Activity Detection on the plurality of audio input interfaces are zero,
judging said input signals of the plurality of audio input interfaces as all invalid, and
re-acquiring input signals of the plurality of input interfaces; and
when at least one of the results of said Voice Activity Detection on the plurality of audio input interfaces is one,
judging said input signals of the plurality of audio input interfaces as valid,
acquiring energy values of said input signals of the plurality of audio input interfaces, and
acquiring an interface identification of the audio input interface of which the energy value is the maximum among the energy values.

16. The one or more non-transitory computer readable storage medium according to claim 14, wherein, after said acquiring input signals of the plurality of audio input interfaces, the iterative process further comprises the steps of:

acquiring signal-noise ratios of said input signals of the plurality of audio input interfaces;

when each of said signal-noise ratios of said input signals is less than a preset value of signal-noise ratio,
- judging said input signals of the plurality of audio input interfaces as invalid, and
- re-acquiring said input signals of the plurality of audio input interfaces; and when at least one of said signal-noise ratios of each of said input signals is no less than said preset value of signal-noise ratio,
- judging every one of said input signals as valid,
- acquiring energy values of said input signals of the plurality of audio input interfaces, and
- acquiring an interface identification of the audio input interface of which the energy value is the maximum among the energy values.

17. The one or more non-transitory computer readable storage medium according to claim 14, wherein, said acquiring input signals of the plurality of audio input interfaces comprises following sub-steps:

simultaneously collecting input signals of the plurality of audio input interfaces, and encapsulating said input signals of the plurality of audio input interfaces collected at the same time into a frame of detection data;

de-interleaving each of frames of said detection data so as to acquire said input signals of the plurality of audio input interfaces.

* * * * *